US012651820B2

(12) United States Patent
Salme et al.

(10) Patent No.: US 12,651,820 B2
(45) Date of Patent: Jun. 9, 2026

(54) COMMUNICATION DEVICE AND ASSOCIATED METHOD

(71) Applicant: AGC GLASS EUROPE, Louvain-la-Neuve (BE)

(72) Inventors: Günther Salme, Gosselies (BE); Rafik Addaci, Gosselies (BE); Mohsen Yousefbeiki, Gosselies (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 14 days.

(21) Appl. No.: 18/857,685

(22) PCT Filed: Apr. 19, 2023

(86) PCT No.: PCT/EP2023/060207
§ 371 (c)(1),
(2) Date: Oct. 17, 2024

(87) PCT Pub. No.: WO2023/203110
PCT Pub. Date: Oct. 26, 2023

(65) Prior Publication Data

US 2025/0266603 A1 Aug. 21, 2025

(30) Foreign Application Priority Data

Apr. 21, 2022 (EP) .................................... 22169303

(51) Int. Cl.
*H01Q 1/12* (2006.01)
*H01Q 5/50* (2015.01)

(52) U.S. Cl.
CPC ......... *H01Q 1/1271* (2013.01); *H01Q 1/1207* (2013.01); *H01Q 5/50* (2015.01)

(58) Field of Classification Search
CPC ....... H01Q 1/1271; H01Q 1/1207; H01Q 5/50
See application file for complete search history.

(56) References Cited

U.S. PATENT DOCUMENTS 10,714,809 B2 * 7/2020 Takahashi ............ H01Q 1/1271
2016/0172765 A1 6/2016 Motta-Cruz et al.
(Continued)

FOREIGN PATENT DOCUMENTS

WO WO 2013/092821 A1 6/2013
WO WO 2019/107514 A1 6/2019

OTHER PUBLICATIONS

International Search Report issued Jul. 4, 2023 in PCT/EP2023/060207, filed on Apr. 19, 2023, 3 pages.

*Primary Examiner* — Seung H Lee
(74) *Attorney, Agent, or Firm* — Oblon, McClelland, Maier & Neustadt, L.L.P.

(57) ABSTRACT

A communication system includes a window; a transparent open container including a back side and at least two opposite lateral sides, the back side and the lateral sides including a same metallic-based material; a transparent antenna system radiating at a defined range of wavelengths; an installation interface panel; and where the antenna system and the installation interface panel are attached inside the transparent open container and the antenna system and the interface layer are attached in front of the window. The antenna system is placed between the back side and the installation interface panel at a defined distance, Daw wherein Daw>0, from the window, the installation interface panel is placed a defined distance, Diw wherein Diw>0, from the window, and the back side and the lateral sides includes a transparent dielectric panel being fixed by an interlayer to the metallic-based material.

14 Claims, 8 Drawing Sheets

(56) References Cited

U.S. PATENT DOCUMENTS

| | | | |
|---|---|---|---|
| 2020/0161741 | A1 | 5/2020 | Hiramatsu et al. |
| 2022/0021100 | A1 | 1/2022 | Hiramatsu et al. |

* cited by examiner

COMMUNICATION DEVICE AND ASSOCIATED METHOD

CROSS REFERENCE TO RELATED APPLICATIONS

This application is a National Stage entry under 35 U.S.C. § 371 of PCT/EP2023/060207, filed on Apr. 19, 2023, and claims priority to EP patent application Ser. No. 22/169,303.9, filed on Apr. 21, 2022, the entire contents of which are incorporated herein by reference.

TECHNICAL FIELD

The present invention relates to a communication device in general and, more specifically, to a communication device comprising an enhanced performance antenna system with a transparent open container to optimize the transmission and/or the reception of the radio-frequency signals in wireless communications through a window.

The present invention also relates to associated methods and uses.

Thus, the invention concerns multiple domains where a communication device is used to optimize the transmission and/or the reception of an antenna system through a window.

BACKGROUND ART

The advent of 5G with the promise of abundant and low-latency data traffic has put mobile network operators under CAPEX pressure. Higher frequency bands for 5G bring more challenges for coverage deployment, especially in dense urban areas where capacity will be needed and strict EMF limitations apply. The deployment of small cells are described as a good solution for capacity improvement which requires to install a large number of antennas in order to stably perform electromagnetic wave transmission and reception. However, many drawbacks limit the deployment of small cells. First, it is very difficult to find location for new antennas. Second, bringing fiber and electricity outdoor is costly. Finally, urbanistic regulations may limit possibilities for small cells.

Therefore, a promising method for such inevitable network densification is to install the antennas and/or the its associated electronics in buildings in front of glazing while the antenna's main beam is towards the glazing to provide coverage outside the building. This solution brings many advantages compared to other solutions, including quick and easy installation, easy access to fiber and power, and indoor electronics. Furthermore, the antenna system can be designed in such a way that it provides coverage for both indoors and outdoors. Preferably, the antenna system is a transparent antenna in order to keep the aesthetics of the building as much as possible.

On the other hand, it is also necessary to limit the radiation of such indoor-installed antennas inside the buildings in order to comply with the electromagnetic field (EMF) regulations and to protect the occupants against strong radio-frequency radiation.

When an antenna is installed in buildings in front of glazing, a part of its radiated power towards the glazing is reflected back from the interface of the air and the glazing. The amount of the reflected energy depends on the various factors like the operation frequency, the composition of the glazing and its coating system, and the polarization and the direction of the antenna's main beam.

On the other side, the antenna itself not only radiates within its main beam, but also emits an amount of energy in all directions including backwards.

According to the technique described in EP19154761.1, there is at least one metallic element placed over at least a part of the non-fixing portion of the antenna system to reduce the back reflection form the interface of the air and the glazing. However, the technique does not address the problem associated with the energy emitted due to the back radiation of the antenna itself.

The document US2016172765 describes an optically transparent pant antenna assembly comprising an optically transparent antenna and a reflector optically transparent.

The document WO2013092821 describes an optically transparent antenna and a optically transparent container with a back side and lateral sides.

The document WO2019107514 describes an antenna system having a conductive film on the back side.

The document US2020161741 describes an antenna attached to a window.

The document WO2022101507 describes an antenna with a container at the back side.

An object of one embodiment of the present invention is to provide a communication system with an antenna system installed in front of and radiating efficiently through a window while the total backward electromagnetic field emission due to the back radiation of the antenna system and the reflection of the radiated energy from the interface of the air and the glazing is limited.

SUMMARY OF INVENTION

The present invention relates, in a first aspect, to a communication system comprising a window, a transparent open container. The transparent open container comprises a back side and at least two opposite lateral sides. Each of the back side and the lateral sides comprises a same metallic-based material. The communication system comprises a transparent antenna system radiating at a defined range of wavelengths and an installation interface panel.

The solution as defined in the first aspect of the present invention is based on that the communication system further comprises a fixing means configured to attach the antenna system and the installation interface panel inside the transparent open container and configured to attach the antenna system and the interface layer in front of the window.

The solution as defined in the first aspect of the present invention is also based on that the antenna system is placed between the back side and the installation interface panel at a defined distance, Daw wherein Daw>0, from the window.

The solution as defined in the first aspect of the present invention is also based on that the installation interface panel is placed a defined distance, Diw wherein Diw≥0, from the window.

The solution as defined in the first aspect of the present invention is also based on that the back side and the lateral sides comprise a transparent dielectric panel being fixed by an interlayer to the metallic-based material.

The present invention relates, in a second aspect, to method of assembling a communication system according the first aspect of the invention.

The present invention allows the antenna system to radiate higher effective isotropic radiated power towards the desired direction through the window and/or to radiate lower effective isotropic radiated power towards the undesired directions behind the transparent open container manufactured by the first aspect of the present invention.

The present invention relates, in a third aspect, to the use of a communication system in compliance with radiofrequency electromagnetic field exposure standards according to the first aspect of the invention to radiate through the window comprising an interior surface and an exterior surface; the antenna system being attached in front of on the interior surface.

The assembly of the antenna system, the installation interface panel and the transparent open container of the communication system of the first aspect of the invention helps to reduce the energy emitted at a determined distance from the antenna system behind the transparent open container.

Therefore, the present invention solves the need to find new location to place an antenna system for enhanced network densification while allowing seamless and aesthetic integration into urban environments while reducing health risk by reducing the unwanted electromagnetic field exposure of the communication system.

It is noted that the invention relates to all possible combinations of features recited in the claims or in the described embodiments.

The following description relates to building applications but it's understood that the invention may be applicable to others fields like automotive or transportation applications.

BRIEF DESCRIPTION OF THE DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DETAILED DESCRIPTION

Figure 1:
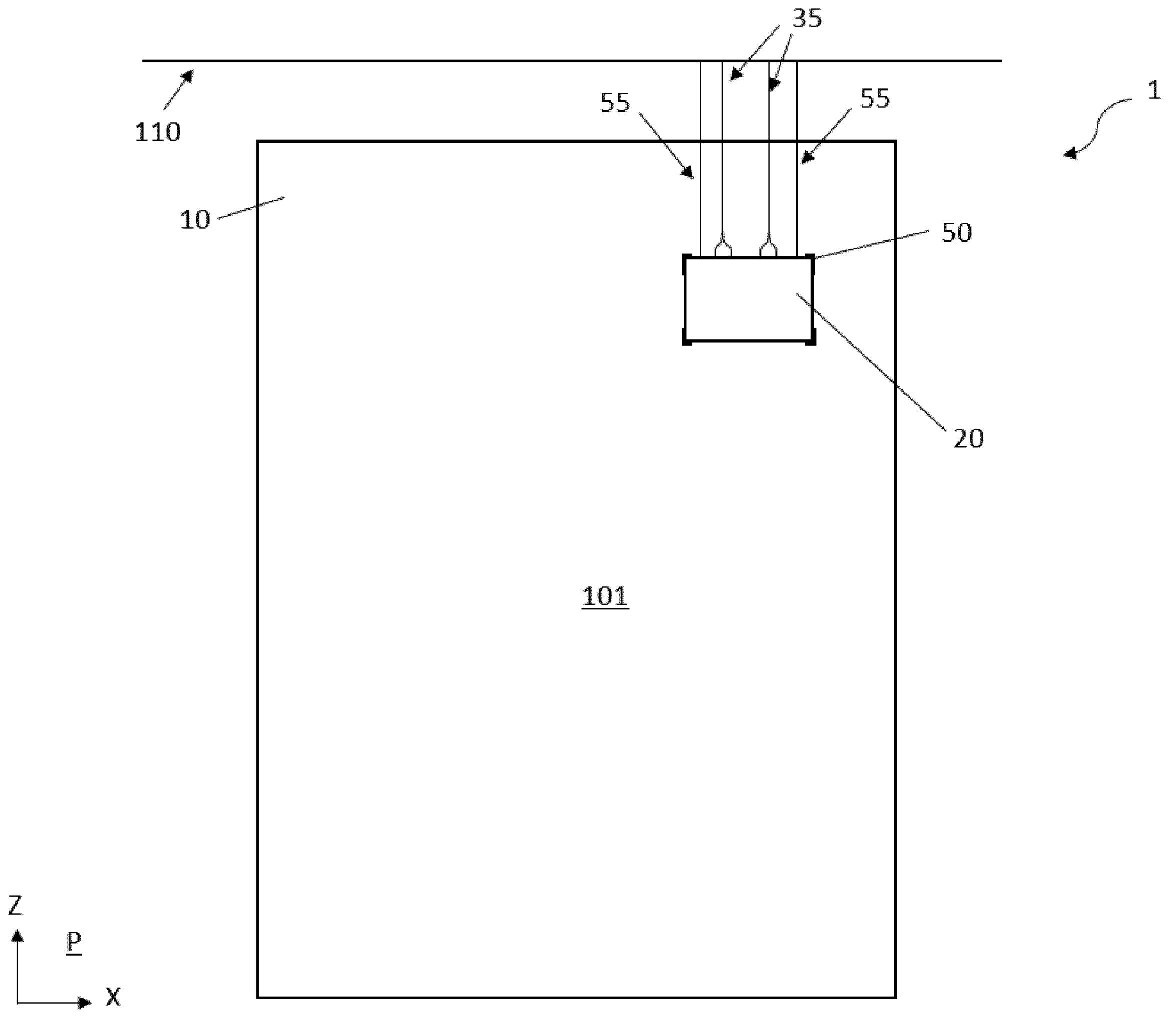
FIG. 1 is a schematic view of a communication system according to the first aspect of the invention.

In this document to a specific embodiment and include various changes, equivalents, and/or replacements of a corresponding embodiment. The same reference numbers are used throughout the drawings to refer to the same or like parts.

As used herein, spatial or directional terms, such as "inner", "outer", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. In the following description, unless otherwise specified, expression "substantially" mean to within 10%, preferably to within 5%.

Moreover, all ranges disclosed herein are to be understood to be inclusive of the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Further, as used herein, the terms "deposited over" or "provided over" mean deposited or provided on but not necessarily in surface contact with. For example, a coating "deposited over" a substrate does not preclude the presence of one or more other coating films of the same or different composition located between the deposited coating and the substrate.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated. In this document, "configured to (or set to)" may be interchangeably used in hardware and software with, for example, "appropriate to", "having a capability to", "changed to", "made to", "capable of", or "designed to" according to a situation. In any situation, an expression "device configured to do" may mean that the device "can do" together with another device or component.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. When it is described that a constituent element (e.g., a first constituent element) is "(functionally or communicatively) coupled to" or is "connected to" another constituent element (e.g., a second constituent element), it should be understood that the constituent element may be directly connected to the another constituent element or may be connected to the another constituent element through another constituent element (e.g., a third constituent element).

It is an object of the present invention to alleviate the above described problems and to remove the barriers to outdoor 4G and 5G network densification while having enhanced antennas installed in front of a window. Especially, the object of the first aspect of the present invention is to manufacture a transparent open container to be installed around an antenna system to reduce the back radiation.

According to the first aspect of the invention, the invention relates to a communication system comprising a window, a transparent open container, a transparent antenna system and an installation interface panel.

In some embodiments, optical transparency and optical discretion are preferred. The latter is defined as a function of human eye acuity, which is the eye ability to distinguish objects separated from a distanced, from an observation distance. The term "transparent", meaning optically transparent. denotes a property illustrating the average TL (light transmission) of visible light transmitted through a material in the visible spectrum of at least 1%. Preferably, transparent relates to a TL property of at least 10%. More preferably, transparent denotes a TL of at least 50%. Ideally, transparent denotes a TL of at least 70%.

According to the invention, the communication comprises a window extending along a plane, P, defined by a longitudinal axis, X, and a vertical axis, Z; having a width, W, measured along the longitudinal axis, X, and a height, H, measured along the vertical axis, Z. The window can be a window used as a window to close an opening of the stationary object, such as a building, or to close an opening of the mobile object, such a train, a boat, . . . .

The window comprising an exterior surface facing the exterior of the stationary or the mobile object and an interior surface facing the interior of the stationary or mobile object.

The transparent antenna system is installed in front of the window to radiate through the window.

The term "in front of" denotes that the antenna system is facing a main surface, the exterior or the interior surface, of the window.

Windows are usually multi-glazed windows to increase thermal performances of the window.

The multi-glazed window can be at least partially transparent to visible waves for visibility, and natural or artificial light. The multi-glazed window is made of multiple panels separated by at least one interlayer, forming multiple interfaces. The panels therefore can be separated by a space filled with gas and/or by a polymeric interlayer.

In some embodiments, the multi-glazed window can comprise at least two glass panels separated by a spacer allowing to create a space filled by a gas like Argon to improve the thermal isolation of the multi-glazed window, assembling an insulating multi-glazed window. The invention is not limited to apparatus for use on multi-glazed window having two panels. The apparatus and method of the present invention are suitable for any multi-glazed window such as double, triple glazed windows.

In some embodiments, the glass panel can be a laminated multi-glazed window such as those to reduce the noise and/or to ensure the penetration safety. The laminated glazing comprises panels maintained by one or more interlayers positioned between glass panels. The interlayers are typically polyvinyl butyral (PVB) or ionoplast or ethylene-vinyl acetate (EVA) for which the stiffness can be tuned. These interlayers keep the glass panels bonded together even when broken in such a way that they prevent the glass from breaking up into large sharp pieces.

Said panels of the multi-glazed window can be made of glass, polycarbonate, PVC or any other material used for a window mounted on a stationary object or on a mobile object.

Usually, the material of the panels of multi-glazed window is, for example, soda-lime silica glass, borosilicate glass, aluminosilicate glass or other materials such as thermoplastic polymers or polycarbonates which are especially known for automotive applications. References to glass throughout this application should not be regarded as limiting.

The multi-glazed window can be manufactured by a known manufacturing method such as a float method, a fusion method, a redraw method, a press molding method, or a pulling method. As a manufacturing method of the multi-glazed window, from the viewpoint of productivity and cost, it is preferable to use the float method.

Each panel can be independently processed and/or colored, . . . and/or have different thickness in order to improve the aesthetic, thermal insulation performances, safety, . . . . The thickness of the multi-glazed window is set according to requirements of applications.

The multi-glazed window can be any known window used in situ. For example, the multi-glazed window can be processed, ie annealed, tempered, . . . to respect the specifications of security and anti-thief requirements. The window can independently be a clear glass or a colored glass, tinted with a specific composition of the glass or by applying an additional coating or a plastic layer for example. The window can have any shape to fit to the opening such as a rectangular shape, in a plan view by using a known cutting method. As a method of cutting the multi-glazed window, for example, a method in which laser light is irradiated on the surface of the multi-glazed window to cut the multi-glazed window, or a method in which a cutter wheel is mechanically cutting can be used. The multi-glazed window can have any shape in order to fit with the application, for example a windshield, a sidelite, a sunroof of an automotive, a lateral glazing of a train, a window of a building, . . . .

The shape of the multi-glazed window in a plan view is usually a rectangle. Depending of the application, the shape is not limited to a rectangle and may be a trapeze, especially for a windshield or a backlite of a vehicle, a triangle, especially for a sidelight of a vehicle, a circle or the like.

In addition, the multi-glazed window can be assembled within a frame or be mounted in a double skin façade, in a carbody or any other means able to maintain a multi-glazed window. Some plastics elements can be fixed on the multi-glazed window to ensure the tightness to gas and/or liquid, to ensure the fixation of the multi-glazed window or to add external element to the multi-glazed window. In some embodiments, a masking element, such as an enamel layer, can be added on part of the periphery of the multi-glazed window.

For thermal comfort inside the stationary object or mobile object, a coating system can be present on one interface of the multi-glazed window. This coating system generally uses a metal-based layer and infrared light is highly refracted by this type of layer. Such coating system is typically used to achieve a to a low-energy multi-glazed window.

In some embodiment, the coating system can be a heatable coating applied on the multi-glazed window to add a defrosting and/or a demisting function for example and/or to reduce the accumulation of heat in the interior of a building or vehicle or to keep the heat inside during cold periods for example. Although coating system are thin and mainly transparent to eyes.

Usually, the coating system is covering most of the surface of the interface of the multi-glazed window.

The coating system can be made of layers of different materials and at least one of these layers is electrically conductive. In some embodiments, for example in automotive windshields, the coating system can be electrically conductive over the majority of one major surface of the multi-glazed window. This can causes issues such as heated point if the portion to be decoating is not well designed.

A suitable coating system is for example, a conductive film. A suitable conductive film, is for example, a laminated film obtained by sequentially laminating a transparent dielectric, a metal film, and a transparent dielectric, ITO, fluorine-added tin oxide (FTO), or the like. A suitable metal film can be, for example, a film containing as a main component at least one selected from the group consisting of Ag, Au, Cu, and Al.

The coating system may comprise a metal based low emissive coating system. Such coating systems typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometers, mostly about 5 to 20 nm. The dielectric layers are generally transparent and made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

In some preferred embodiments, to maximize the transmission and the reception of the antenna system in front of the window having a coating system, a decoated portion can be made in front of the antenna system to alleviate attenuation due to the coating system.

The term "open container" denotes a container having at least an opened side.

The transparent open container comprises at least a back side and at least two opposite lateral sides. Lateral sides are on the sides of the central side and a edge of a lateral side corresponds to a edge of the central side. A Lateral side can be a right side, a left side, a bottom side and/or a top side.

In some embodiments, the two opposite lateral sides are along the X-axis, forming a U-shape transparent open container in the X-Y plane.

In some other embodiments, the two opposite lateral zones can be along the Z-axis, forming a U-shape transparent open container in the Y-Z plane.

In some embodiments, the transparent open container comprises four lateral sides, a right side, a left side, a bottom side and a top side.

According to the invention, the transparent open container can comprises a dielectric panel to ensure the mechanical strength.

A dielectric panel is a panel that is not electrically conductive.

The transparent dielectric panel can have different chemical composition, such as plastic-based composition. The plastic-based composition can be PET, polycarbonate, PVC or any other transparent dielectric plastic-based that can be used as a panel.

Preferably, the transparent dielectric panel comprises a glass panel. The glass panel can comprises at least 50% in weight of SiO2 such as glass like soda lime glass, aluminosilicate glass or borosilicate glass.

Preferably, borders of the transparent dielectric panel are chamfered to avoid breakage.

The dielectric panels can be manufactured by a known manufacturing method such as a float method, a fusion method, a redraw method, a press molding method, or a pulling method. As a manufacturing method of the glass panel, from the viewpoint of productivity and cost, it is preferable to use the float method.

In some embodiments, the transparent open container can comprises more than one dielectric panel.

Each transparent dielectric panel can be independently processed and/or colored, . . . and/or have different thickness in order to improve the aesthetic, safety, . . . .

Each transparent dielectric panel can be processed, i.e. annealed, tempered, . . . to respect the specifications of security requirements. The transparent dielectric panel can independently be a clear or a colored transparent dielectric panel, tinted with a specific composition or by applying an additional coating or a plastic layer for example.

In some embodiments, transparent dielectric panels has the same chemical composition to reduce the handling and the process of manufacturing.

To fix the transparent dielectric panel with the metallic-based material, at least one interlayer between the transparent dielectric panel and the metallic-based material can be used. The interlayer(s) is fixing the metallic-based material with the transparent dielectric panel. The interlayer permits to fix the metallic-based material with the transparent dielectric panel on a fixing surface of the transparent dielectric panel.

It is preferred to sandwich the metallic-based material with a transparent dielectric panel on the first and second surfaces via interlayers for the sake of mechanical strength. In such embodiments, the back side and the lateral sides comprise two transparent dielectric panels, each being fixed by an interlayer to the metallic-based material to sandwich the metallic-based material.

The interlayer is placed between the transparent dielectric panel and metallic-based material.

Preferably the interlayer is fixing the majority of the surface of the transparent dielectric panel.

In some embodiments, the interlayer can be made of a single layer of material or multiple layer of single or different material.

In some embodiments, the interlayer can be made of single sheet of material or a plurality of sheets placed next to each other to form a single-like sheet.

In some embodiments, the interlayer is a glue.

In some other embodiments, the interlayer is a interlayer able to laminate the transparent dielectric panel with the continuous metallic-based sheet. Preferably, such interlayer can be transparent plastic interlayer. Transparent plastic interlayer can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-olefin polymer (COP), cyclo-Olefin copolymer (COC) or an Optical Clear Adhesive (OCA).

Crosslinked or cured resins are known to the skilled person and are three dimensional polymer networks obtained by the crosslinking/curing of low molecular weight species either by reaction with a curing agent also known as crosslinker or upon exposure to heat, UV radiations (UV) or electron beam (EB). Non exhaustive examples of crosslinked resins are epoxy resins, polyurethane resins, UV or EB curable resins. In the present invention, the precursors of the crosslinked resin may be transparent or not provided that the crosslinked resin is transparent.

Remark that some polymer mixtures, copolymers and some semi-crystalline polymers can be opaque and non-transparent due to a dispersed phase or due to the presence of crystallites. Hence it is possible that not all compositions of the listed polymers mentioned above are transparent. The person skilled in the art is capable to identify what composition is transparent and hence identify if a given polymer falls within the claimed transparent polymers.

According to the invention, the back side and the lateral sides of the transparent open container comprise a metallic-based material.

In some embodiments, the metallic-based material is a continuous metallic-based sheet.

The term “continuous” means that the metallic-based is composed of unseparated parts.

Preferably, the continuous metallic-based sheet is a single continuous metallic-based sheet meaning that is the single sheet is used for the back side and for lateral sides.

The continuous metallic-based sheet is preferably a transparent continuous metallic-based sheet.

In some embodiments, the continuous metallic-based sheet is a metallic meshed structure. The metallic meshed structure is preferably a metallic mesh in form of a grid. The grid can have any shape such as rectangular, hex, squared, circular, . . . in order to shield against EM fields at a given range of wavelengths.

The metallic meshed structure can be advantageously a transparent metallic meshed structure made of transparent semiconductor materials such as Indium Thin Oxide.

Preferably, the metallic meshed structure is not transparent.

The metallic meshed structure can be made by any known methods such as pulverisation, vacuum evaporation, laser ablation, chemical deposition (silvering, coppering, gilding, aluminiuming, tinning, nickeling . . . ), silkscreen printing, electrolytic deposit, chemical deposition in vapour phase (CVD, PECVD, OMCVD . . . ), etc.

The openings of the metallic meshed structure can be made by standard methods such as photolithography from a photomask or a mask transferred by laser writer onto a reserve and associated chemical etching, or any other known method.

A coating can be applied on top and/or the bottom of the metallic meshed structure, preferably a blackened coating to protect the metallic material while reducing the diffusion.

The conductive metallic meshed structure can be obtained from a metallic foil machined in such a way it becomes optically transparent while keeping an electrical opacity. This machining is called “meshing” and is described as follows.

The metallic meshing is for example of iron, nickel, chrome, titanium, tantalum, molybdenum, tin, indium, zinc, tungsten, platinum, manganese, magnesium, lead, preferably made of silver, copper, gold or aluminum or alloy of metals selected according to conductivity electrical. It typically takes the form of a grid whereof the ratio between the dimension of the openings of the mesh and the width of the metallic tracks of the mesh defines the level of optical transparency of the sheet.

It is specified here that dimensioning of the meshing is characterized by its pitch (or its periodicity), by the width and the thickness of the conductive tracks (or by the opening made in the pitch).

Preferably, the thickness and the width of the meshing is equal to or higher than three times the skin depth of the metallic material at the given range of wavelengths, preferably thickness and the width of the meshing is equal to or higher than four times the skin depth of the metallic material at the given range of wavelengths, and more preferably thickness and the width of the meshing is equal to or higher than five times the skin depth of the metallic material at the given range of wavelengths.

The optical transparency of the metallic meshed structure, TLm, is defined, in a first approximation, as the ratio of opened surfaces over total surface. The ratio can be adapted to obtain the desired optical transparency keeping an electrical opacity.

From the electrical point of view, the unit cell of the grid should much lower than the operating wavelength of an enclosed antenna system, given by the operating frequency f, in GigaHertz (GHz).

Preferably, the meshed structure is a woven metallic mesh and more preferably a fine woven metallic mesh to have this optical transparency while keeping the electrical opacity.

In some embodiments, the meshed structure is a metal, such as copper, Aluminium, silver, stainless steel. The meshed structure can be disposed on a plastic film, preferably with a thickness of 25 to 200 μm. The plastic film is preferably a polymer film and a transparent polymer film. Preferably, transparent polymer film can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-olefin polymer (COP), cyclo-Olefin copolymer (COC) or an Optical Clear Adhesive (OCA).

Crosslinked or cured resins are known to the skilled person and are three dimensional polymer networks obtained by the crosslinking/curing of low molecular weight species either by reaction with a curing agent also known as crosslinker or upon exposure to heat, UV radiations (UV) or electron beam (EB). Non exhaustive examples of crosslinked resins are epoxy resins, polyurethane resins, UV or EB curable resins. In the present invention, the precursors of the crosslinked resin may be transparent or not provided that the crosslinked resin is transparent.

Remark that some polymer mixtures, copolymers and some semi-crystalline polymers can be opaque and non-transparent due to a dispersed phase or due to the presence of crystallites. Hence it is possible that not all compositions of the listed polymers mentioned above are transparent. The person skilled in the art is capable to identify what composition is transparent and hence identify if a given polymer falls within the claimed transparent polymers.

Antenna system according to the invention has typically a weight of about 1 kg to 10 kg and in some embodiments about 2 kg to 3 kg. The parallelepiped has typically a width and/or a length comprised between 20 mm to 600 mm for example a rectangular shape of 210 mm×250 mm, a rectangular shape of 150 mm×160 mm or rectangular shape of 255 mm×500 mm depending on the operating frequencies, the number of antenna arrangements, the number of elements comprised in the antenna arrangement and/or the transparency design. The transparent antenna system can comprises at least one antenna unit. An antenna unit works for Wi-Fi, 4G and/or 5G, meaning wavelengths with frequencies from 690 MHz to 70 GHz.

In some embodiments, the transparent antenna system can comprises several antenna units working at the same or different range of wavelengths.

In some embodiments, the transparent antenna system can comprise at least one connector protruding from the antenna system to power the antenna unit and transceive the signal. A cable is then connected to the at least one connector. The number of connectors depends of the number of antenna units and the type of antenna units used.

In such embodiments, the surface of the back side is equal to or greater than the surface defined by the antenna system in the X-Y plane to which it is added the area defined by the height of the at least one connector to minimize back radiation of the at least one connector because the at least one connector might contribute to the radiation of the EM waves.

In some other embodiments, the cable can be directly connected to the antenna units without a connector.

The installation interface panel is placed between the antenna system and the window. The installation interface panel permits to cancel out the impact of the window on the antenna system performance and permits to maintain the impedance response of the antenna system as well as the radiation properties of the antenna unit(s) of the antenna system within the specifications. In some embodiments, the installation interface panel can add more functionalities to the antenna system, such as the beam steering or beam shaping.

The installation interface panel can comprise at least a transparent dielectric panel such as glass and/or plastic. In some embodiments, at least a conductive pattern can be deposited on at least one of dielectric panels.

Suitable transparent antenna systems and/or installation interface panels ensuring the transparency are described in co-pending applications EP20207878.8 and EP20207890.3 which are totally incorporated by reference into the present patent application.

According to the invention, the communication system further comprises a fixing means.

The fixing means is configured to attach the antenna system and the installation interface panel inside the transparent open container and configured to attach the antenna system and the interface layer in front of the window, meaning that the transparent open container is at least partially surrounding the antenna system and the installation interface panel. The antenna system is placed between the back side and the installation interface panel at a defined distance, Daw, a strictly positive integer (Daw>0), from the window. The installation interface panel is placed a defined distance, Diw, a positive integer (Diw≥0), from the window.

In some embodiments, the antenna system can be in front of the exterior surface of the window to radiate through the window to the inside of the object.

In some embodiments, the antenna system can be in front of the interior surface of the window to radiate through the window to the outside of the object. The antenna system and the transparent open container are installed on the interior side of the window, meaning inside the building and the antenna radiates through the window to permit to user outside of the building to obtain an EM signal while restricting the radiation of the antenna inside of the object.

The fixing means can have several shapes depending to the specific application.

According to some embodiments of the invention, the fixing means can comprise a hanging means to hang the antenna system in front of the window.

The fixing means can be a single means or a multiple means.

The hanging means can comprise a cable, a glue, a tape or any other suitable element to hang an antenna system in front of a window.

Preferably, cables can have a diameter comprises between 0.5 and 3 mm and more preferably around 2 mm.

According to some embodiments of the invention, the fixing means can comprise a separating means to separate the antenna system at the defined distance, Daw, from the window and to separate the installation interface panel at the defined distance, Diw, from the window.

In some embodiments, the fixing means can comprises notches to place and/or displace the antenna system and the installation interface panel at the corresponding distance from the window.

According to some embodiments of the invention, the fixing means can comprise an attaching means to attach the antenna system and the installation interface panel inside the transparent open container.

In some embodiments, the attaching means can comprise slots in which a portion of lateral sides are fixed and permits to maintain the transparent open container in the correct 3D shape.

In some embodiments, the separating means and the attaching means can be a single mean.

The present invention relates, in a second aspect, to method of assembling a communication system according the first aspect of the invention.

FIG. 1 illustrates an embodiment in which the antenna system is surrounded by the transparent open container 20.

In this embodiment, the fixing means comprises an hanging means. The hanging means comprises two cables 55 to hang the antenna system in front of a window 10 and in front of a surface 101, preferably the interior surface. Cables are attached to the ceiling 110. It is understood that the hanging means can be attached to the frame of the window, to the ceiling or any other place depending on the specific application and location.

In this embodiment, the fixing means comprises an attaching means 50 to attach the antenna system and the installation interface panel inside the transparent open container. The attaching means corresponds to four corner elements.

The antenna system is powered by coaxial cables 35. Such coaxial cable are preferably exiting out of the transparent open container from the top side to the ceiling in a hidden way and connect to a communication (WiFi, 4G and/or 5G) device.

Figure 2:
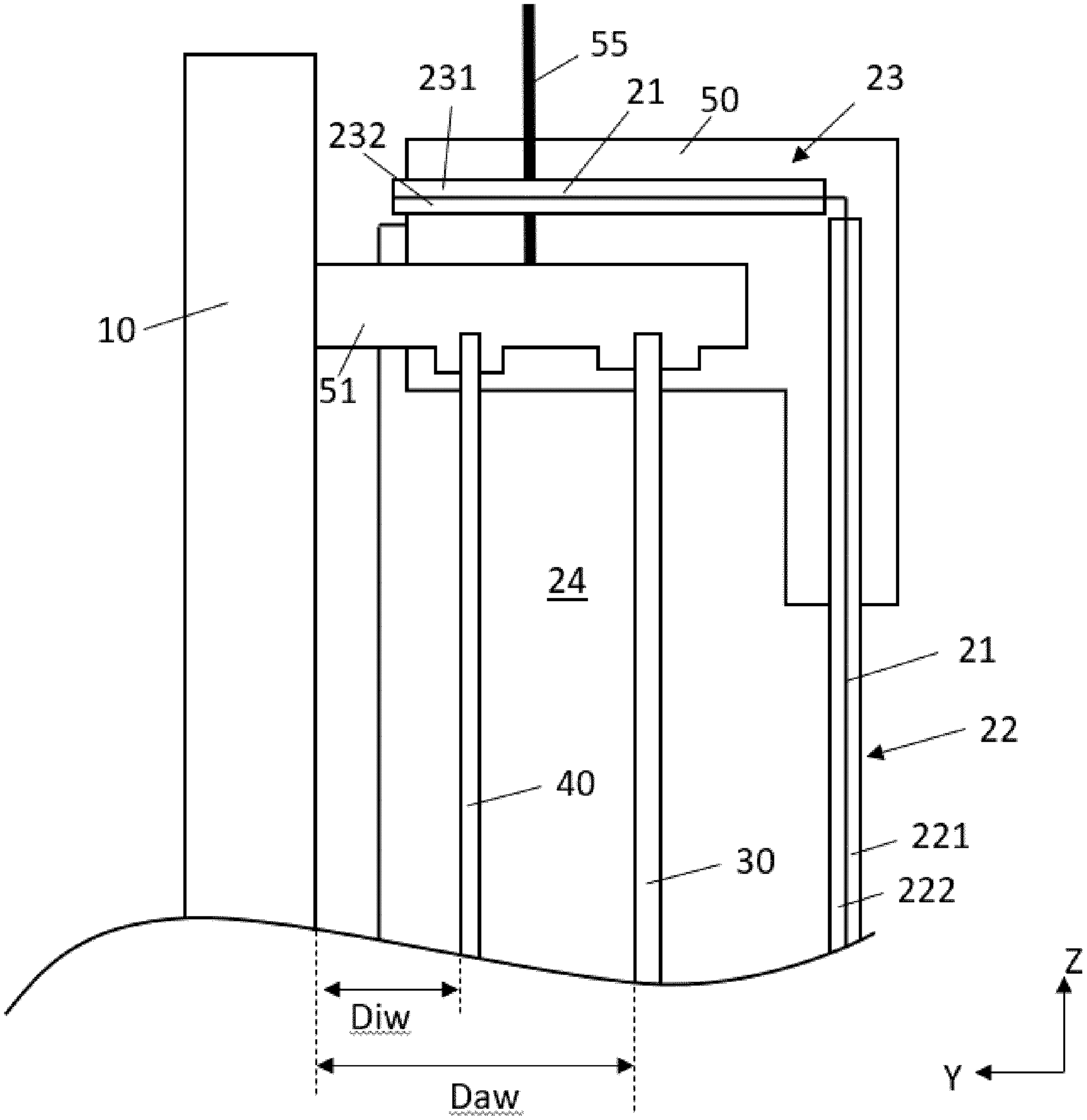
FIG. 2 is a schematic sectional view of a part of a communication system according to the first aspect of the invention.

FIG. 2 illustrates an embodiment the fixing means comprises a separating means 51. In such embodiment, the separating means comprises elements such as notches to maintain the installation interface layer 40 and the antenna system 30 at a defined distance respectively Diw and Daw from the window 10 to optimize the reception and/or the transmission of the antenna system.

Preferably, the defined distance Diw is between 0.5 mm and 10 mm measured from the surface of the window to the first surface of the installation interface layer 40, meaning the nearest surface from the window.

Preferably, the defined distance Daw is between 4 mm and 50 mm measured from the surface of the window to the first surface of the antenna system 30, meaning the nearest surface from the window.

Preferably, the defined distance Daw is greater than 1/10 of the wavelength, more preferably 1/8 of the wavelength, and ¼ of the wavelength meaning that preferably the defined distance Daw equals to or is higher than 7 mm for 4G and 5G sub-6 GHz.

In some embodiments, Daw=30 mm and Diw=2 mm for the antenna systems operating at the frequencies 1.8 GHz/2.1 GHz/3.5 GHz. In some other embodiments, Daw=15 mm and Diw=4 mm for the antenna systems operating at the frequencies 3.5 GHz/4.2 GHz.

In this embodiment, the fixing means comprises an attaching means 50 to attach the antenna system and the installation interface panel inside the transparent open container.

The attaching means 50 and the separating means 51 can be a single piece or two different pieces.

In this embodiment, the fixing means comprises an hanging means. The hanging means can be a cable 55, a glue, a combination of elements to hang the antenna system in front of the window.

In this embodiment, the transparent open container has at least a back side 22 and lateral sides 23, 24. The back side comprises a continuous metallic-based sheet 21 and two dielectric panels 221, 222. The top lateral side 23 comprises a continuous metallic-based sheet 21 and two dielectric panels 231, 232.

Preferably, the continuous metallic-based sheet of the back side and lateral sides is a single continuous metallic-based sheet meaning that it is the same sheet that is sandwiched between interlayers and dielectric panels 221, 222 of the back side and between interlayers and dielectric panels 231, 232 of the lateral sides, the top side 23 as illustrated.

In FIG. 2, The main radiation beam of the antenna system 30 passes through the installation interface layer 40 and then through the window 10. The transparent open container limits the radiation behind the antenna system.

FIGS. 3 to 7 illustrates an embodiment in which the fixing means comprises a hanging means 55, a separating means 51 and a attaching means 50.

In some embodiments, antenna systems 30 can be made of a single stack of material or double stacks 31, 32 of material.

In some embodiments, the separating means 51 can be separating corner elements to maintain the antenna system 31, 32 at the defined distance Daw from the window. To maintain together said corner elements, tightening means 511, 512, 513, 514, such as rods, designed to tighten said corner elements on the antenna system 31, 32 and the installation interface panel 40 at defined distances Daw, Diw.

Figure 3:
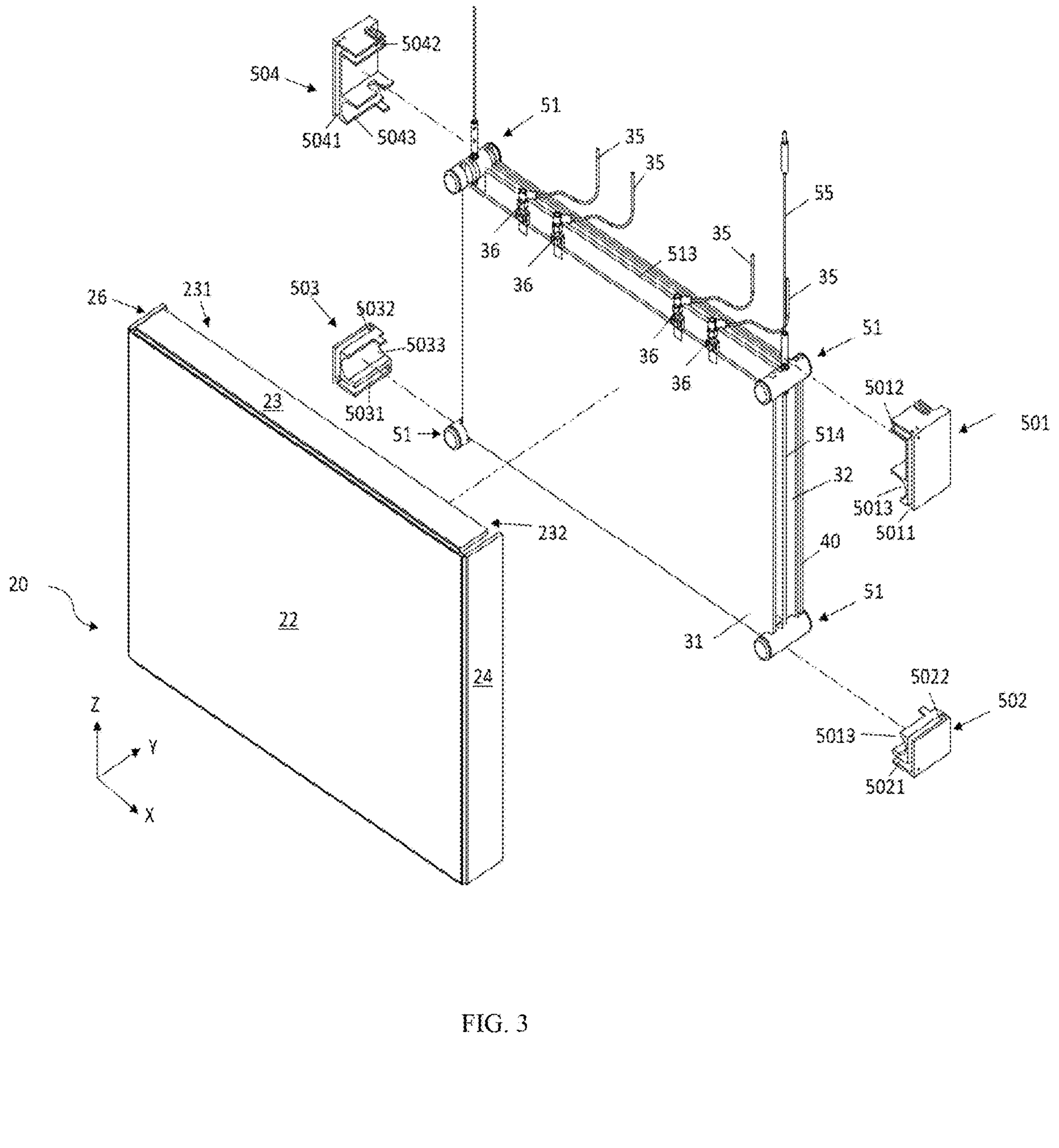
FIG. 3 is an exploded schematic 3D view of a communication system according to an embodiment of the invention.

In some embodiments, separating corner elements can have any shape such as cylinder shape as illustrated in FIG. 3.

In some embodiments, attaching means 50 comprises at least two attaching corners elements 501, 502, 503, 504 or any other suitable element to attach an transparent open container around an antenna system.

In such embodiment, said attaching corner elements comprises:

- a top-left corner element 504 comprising a left slot 5041 in which a part of the left side 26 is fixed and a top slot 5042 in which a part of the top side 23 is fixed;
- a top-right corner element 501 comprising a right slot 5011 in which a part of the right side 24 is fixed and a top slot 5012 in which a part of the top side 23 is fixed;
- a bottom-left corner element 503 comprising a left slot 5032 in which a part of the left side 26 is fixed and a bottom slot 5031 in which a part of the bottom side 25 is fixed; and
- a bottom-right corner element 502 comprising a right slot 5022 in which a part of the right side 24 is fixed and a bottom slot 5021 in which a part of the bottom side 25 is fixed.

In some embodiments, lateral sides can be pinched, siliconed, glued or any other suitable manner in said slots.

In some embodiments, the attaching means 50 comprises a clipping means 5013, 5023, 5033, 5043 to clip or by any other suitable manner, to the separating means to maintain the transparent open container surrounding the antenna system.

Such attaching means can be made of plastic, metal or any other suitable material.

This embodiment is specifically suitable to add a transparent open container to an existing antenna system already placed in front of a window.

Figure 7:
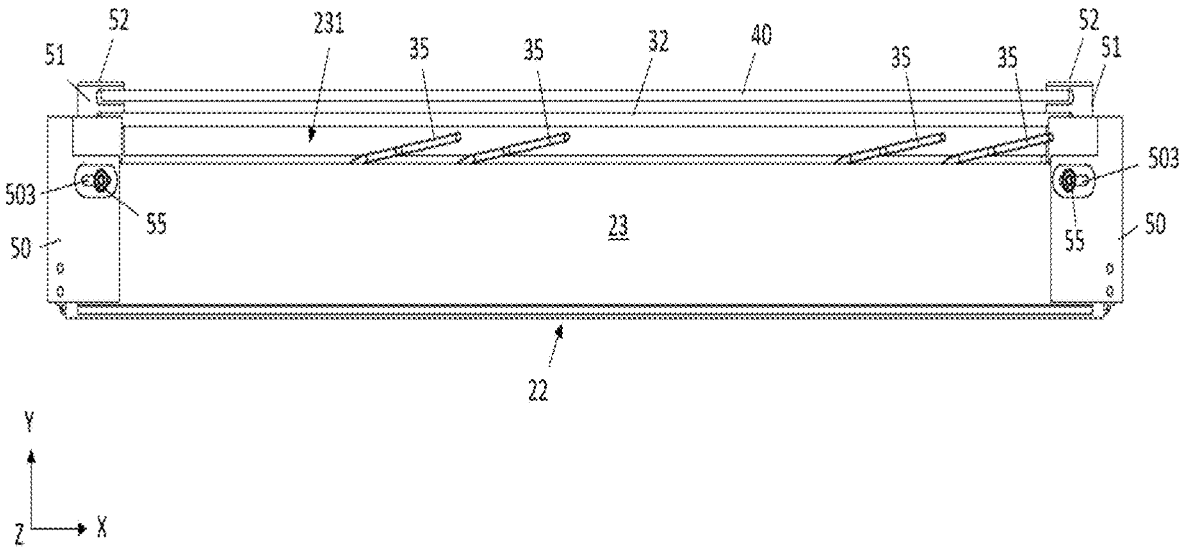
FIG. 7 is an exploded schematic view from the top of the communication system according to an embodiment of the invention.

According to some embodiments and as shown by FIG. 3 and FIG. 7, the top side 23 can comprises a cut-off 231 to let feeding coaxial cables 35 passing from the inside of the transparent open container to the outside of the transparent open container.

According to some embodiments and as shown by FIG. 3 and FIG. 7, the top side 23 can comprise a cut-off 232 to let hanging means passing from the outside of the transparent open container to the inside of the transparent open container.

Figure 4:
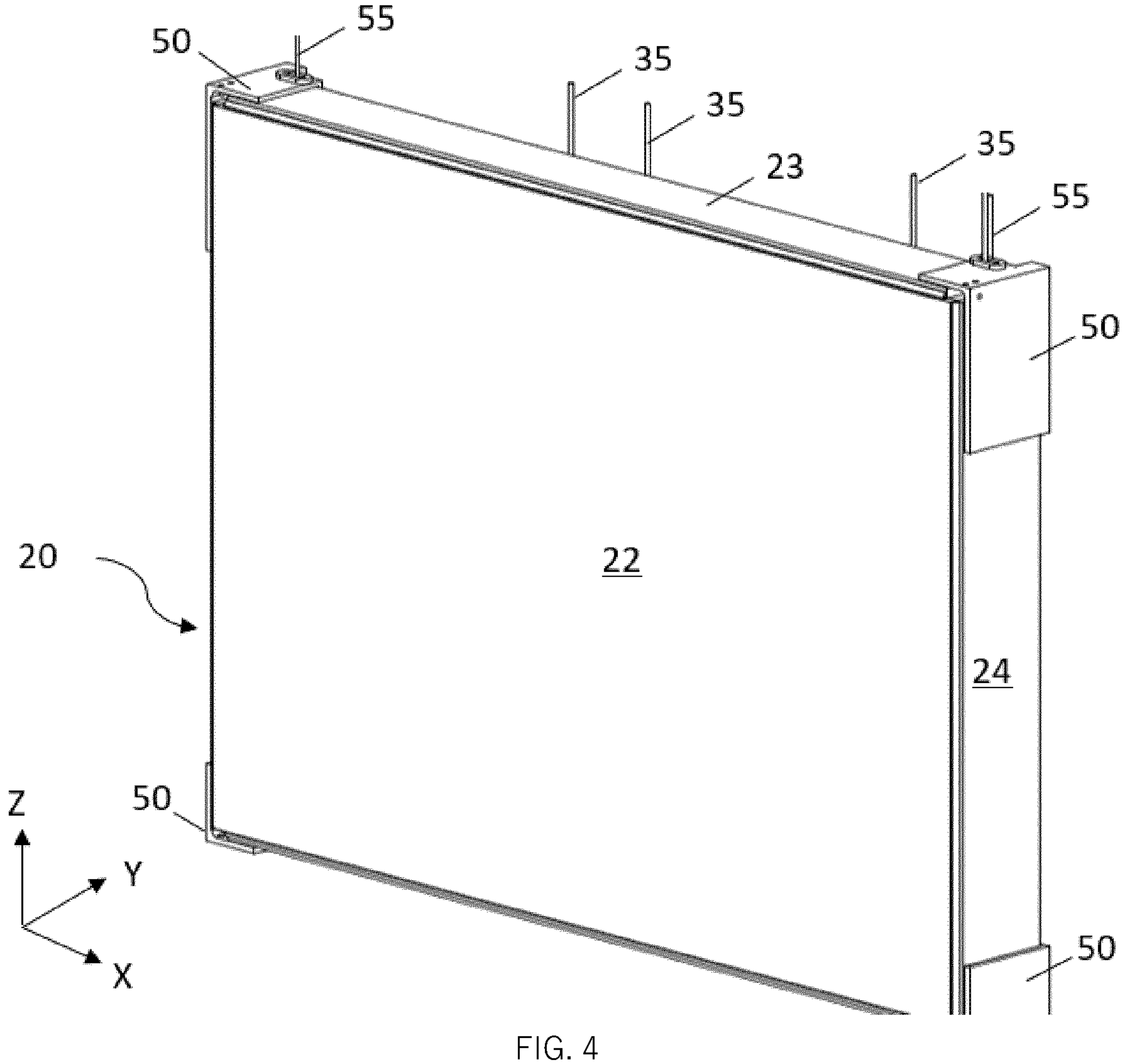
FIG. 4 is an schematic 3D view of the communication system according to an embodiment of the invention.
Figure 5:
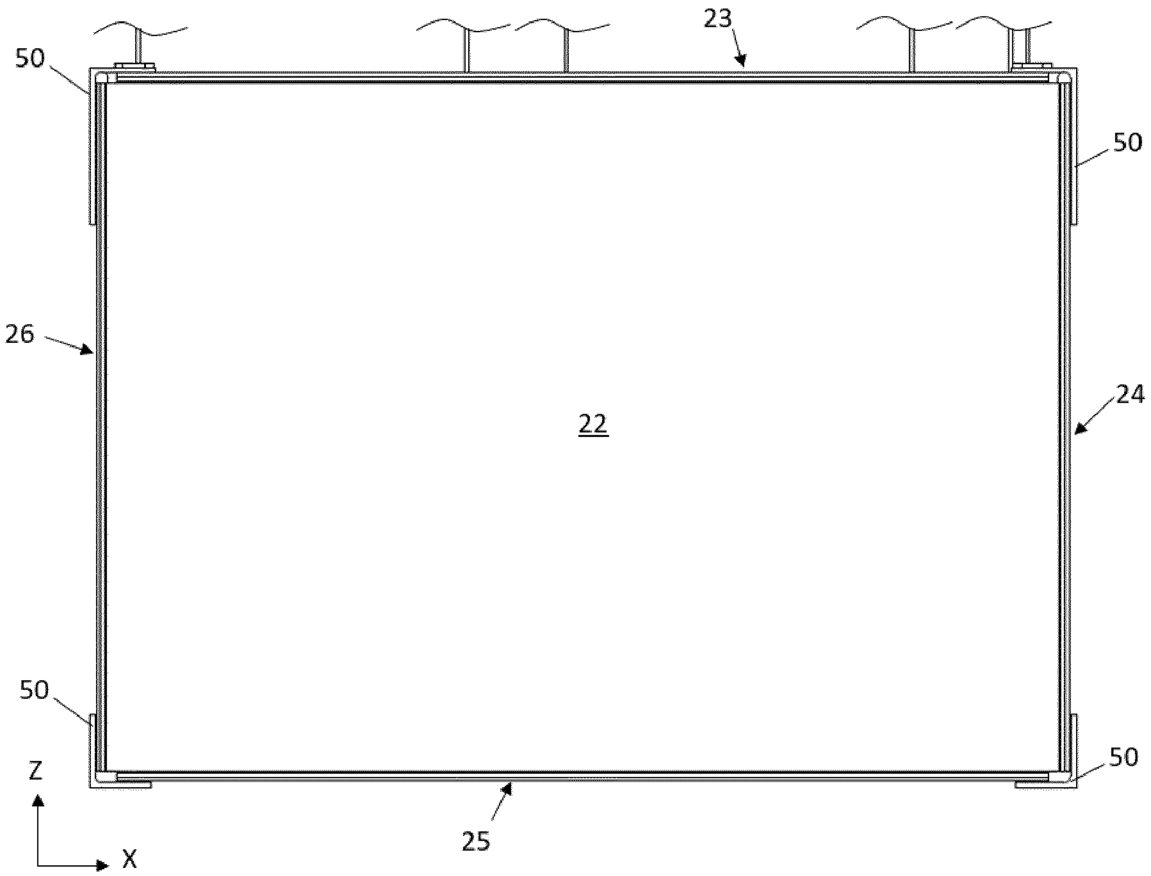
FIG. 5 is an exploded schematic view from the interior of a stationary or mobile object of the communication system according to an embodiment of the invention.

FIG. 4 illustrates an embodiment in which the transparent open container is surrounding the antenna system.

Preferably, the installation interface panel has a surface in the X-Z plane substantially similar to the surface in the X-Z plane of the antenna system 30.

In some embodiments, the antenna system comprises at least one connector 36 to connect feeding coaxial cables 35 to antenna units.

Figure 6:
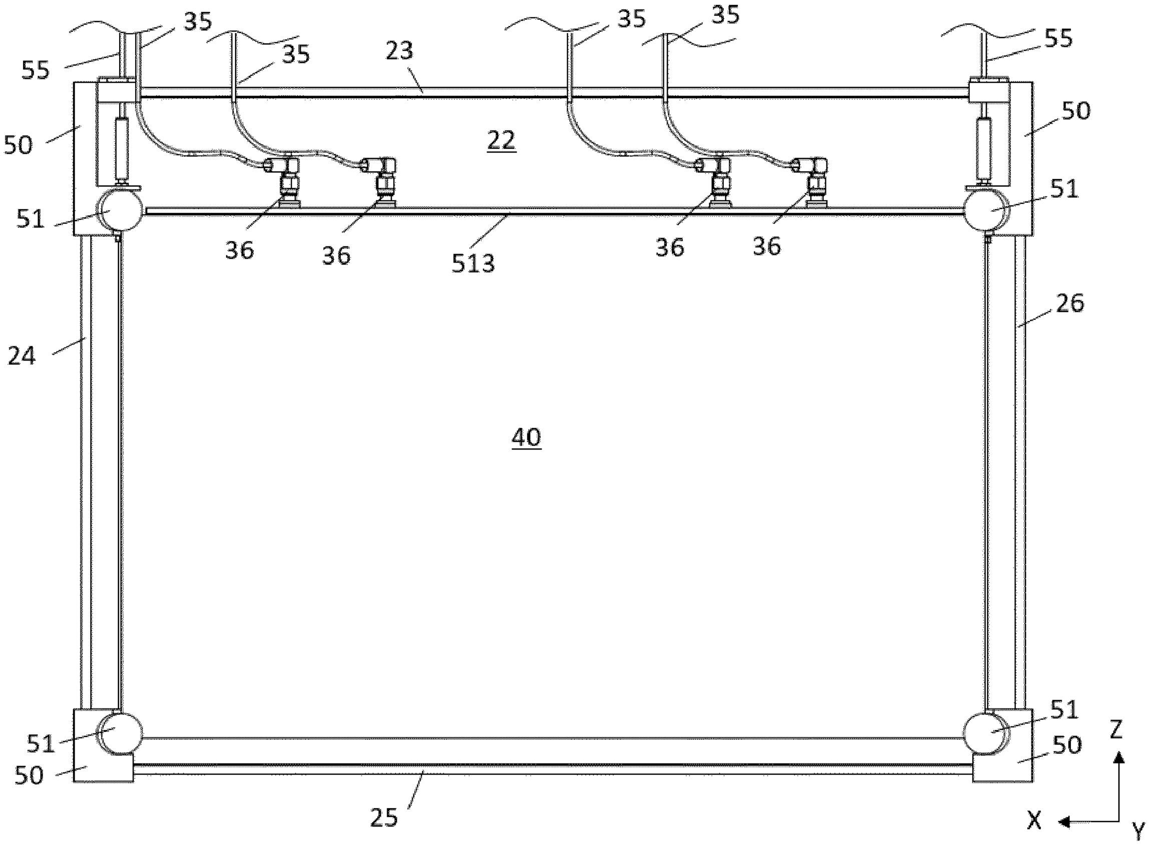
FIG. 6 is an exploded schematic view from the window of the communication system according to an embodiment of the invention.

In some embodiments, as illustrated in FIG. 6, the surface of the back side 22 is greater than the surface of the antenna 40 to which it is added the area defined by the height of the at least one connector 36.

In this second aspect, the method can comprises a step of manufacturing the transparent open container. Preferably, this step comprises sub-steps of providing a metallic-based material, depositing on at least a surface of the metallic-based material a transparent dielectric panel being fixed by an interlayer; forming a flat assembly; and bending the flat assembly to form a transparent open container.

In FIG. 7, according to some embodiments, the attaching means 50 can comprises opening 503 to let hanging means 55 passing through it.

In FIG. 7, according to some embodiments, the separating means 51 can comprise a glue, a double faced tape, a suction pad or any other means 52 to fix an antenna system on a surface 101 of a window 10.

In some preferred embodiments, dielectric panels of the back side and/or lateral sides are separated from dielectric panels of adjacent side by a non-zero distance to avoid any breakage of said dielectric panels.

In some embodiments, back side and lateral sides are maintained together by a glue, a silicone and/or by the metallic-based material.

The present invention relates also to a method to add a transparent open container surrounding an antenna system and an installation interface panel to reduce back radiation of the antenna system.

Figure 8:
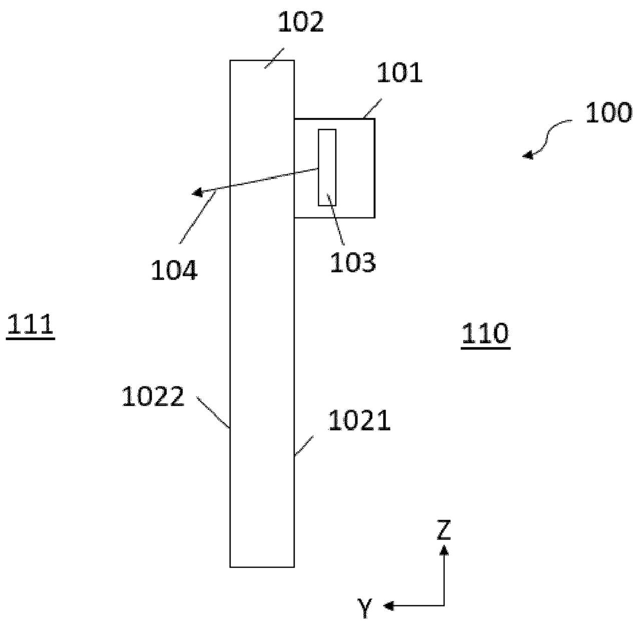
FIG. 8 is a schematic view of a communication system according to the further aspect of the invention.

According to the third aspect of the invention and as illustrated in FIG. 8, the invention relates to the use of a communication system 100 to radiate through the window comprising an interior surface and an exterior surface; the antenna system being attached in front of on the interior surface. The communication system 100 comprises a window 101, a transparent open container 102, an antenna system 103 radiating 104 at a defined range of wavelengths through the window; the antenna system and the transparent open container been assembled by the method according to the second aspect of the invention.

Preferably, the installation interface panel and the transparent open container being attached in front of on the interior surface 1021 with the antenna system.

In some embodiments, the antenna system, the installation interface panel and the transparent open container are attached in front of on the exterior surface 1022; the antenna system is radiating through the window to permit to user inside of the building to obtain an EM signal while restricting the radiation of the antenna outside of the object.

Preferably, the antenna system, the installation interface panel and the transparent open container are attached directly in front of on the main surface meaning that are substantially against the main surface of the window The present invention solves the need to place enhanced antenna system in front of a window.

The invention claimed is:

1. A communication system, the communication system comprising:

a window;

a transparent open container comprising a back side and at least two opposite lateral sides, each of the back side and the lateral sides comprising a same metallic-based material;

a transparent antenna system radiating at a defined range of wavelengths;

an installation interface panel; and a fixing means configured to attach the antenna system and the installation interface panel inside the transparent open container and configured to attach the antenna system and the interface layer in front of the window, wherein the antenna system is placed between the back side and the installation interface panel at a defined distance, Daw wherein Daw>0, from the window, wherein the installation interface panel is placed a defined distance, Diw wherein Diw≥0, from the window, and wherein each of the back side and the lateral sides comprises a transparent dielectric panel being fixed by an interlayer to the metallic-based material.

2. The communication system according to claim 1, wherein the metallic-based material of the back side and the lateral sides is a continuous metallic-based sheet.

3. The communication system according to claim 2, wherein the metallic-based sheet is a metallic meshed structure.

4. The communication system according to claim 3, wherein the metallic meshed structure is a woven metallic mesh.

5. The communication system according to claim 3, wherein the metallic meshed structure is a metal, and wherein the meshed structure is disposed on a plastic film.

6. The communication system according to claim 1, wherein the back side and the lateral sides comprise two transparent dielectric panels, each being fixed by an interlayer to the metallic-based material to sandwich the metallic-based material.

7. The communication system according to claim 1, wherein the fixing means comprises a hanging means to hang the antenna system in front of the window.

8. The communication system according to claim 7, wherein the hanging means comprises a cable.

9. The communication system according to claim 1, wherein the fixing means comprises a separating means to separate the antenna system at the defined distance, Daw, from the window and to separate the installation interface panel at the defined distance, Diw, from the window.

10. The communication system according to claim 1, wherein the fixing means comprises an attaching means to attach the antenna system and the installation interface panel inside the transparent open container.

11. The communication system according to claim 10, wherein the attaching means comprise slots in which a portion of lateral sides are fixed.

12. The communication system according to claim 1, wherein the window comprises a coating system comprising a decoated portion, and the antenna system radiates through the decoated portion.

13. The communication system according to claim 1, wherein the metallic-based material of the back side and the lateral sides is a single continuous metallic-based sheet.

14. A method, comprising:

generating, via the communication system of claim 1, radiation through the window comprising an interior surface and an exterior surface, the antenna system being attached in front of the interior surface.

* * * * *